(12) United States Patent
Leeper

(10) Patent No.: US 7,346,779 B2
(45) Date of Patent: Mar. 18, 2008

(54) SYSTEM AND METHOD FOR AUTHENTICATING ELECTRONIC DOCUMENTS

(75) Inventor: Kim Leeper, London (GB)

(73) Assignee: Birmingham Systems Limited, London (GB)

( * ) Notice: Subject to any disclaimer, the term of this patent is extended or adjusted under 35 U.S.C. 154(b) by 753 days.

(21) Appl. No.: 10/204,632

(22) PCT Filed: Feb. 23, 2001

(86) PCT No.: PCT/GB01/00803

§ 371 (c)(1),
(2), (4) Date: Feb. 10, 2003

(87) PCT Pub. No.: WO01/63386

PCT Pub. Date: Aug. 30, 2001

(65) Prior Publication Data

US 2003/0195935 A1 Oct. 16, 2003

(30) Foreign Application Priority Data

Feb. 23, 2000 (GB) .................................. 0004287.9

(51) Int. Cl.
*H04K 1/00* (2006.01)
*H04L 9/00* (2006.01)
*G06F 7/04* (2006.01)
*G06F 17/30* (2006.01)
*G06K 9/00* (2006.01)
*H03M 1/68* (2006.01)
*H04N 7/167* (2006.01)

(52) U.S. Cl. .................. 713/186; 713/176; 713/177; 713/178; 713/179; 713/180; 713/181; 726/26; 726/27; 726/28; 726/29; 726/30; 726/3; 726/4; 726/5; 380/231; 380/232; 380/233

(58) Field of Classification Search ............... 713/186
See application file for complete search history.

(56) References Cited

U.S. PATENT DOCUMENTS

| 5,872,848 | A | | 2/1999 | Romney et al. | |
|---|---|---|---|---|---|
| 6,052,468 | A | * | 4/2000 | Hillhouse | 380/281 |
| 6,182,218 | B1 | * | 1/2001 | Saito | 713/176 |
| 6,256,737 | B1 | * | 7/2001 | Bianco et al. | 713/186 |
| 6,401,206 | B1 | * | 6/2002 | Khan et al. | 713/176 |
| 6,516,337 | B1 | * | 2/2003 | Tripp et al. | 709/202 |
| 6,553,494 | B1 | * | 4/2003 | Glass | 713/186 |

FOREIGN PATENT DOCUMENTS

| EP | 0863491 | 9/1998 |
|---|---|---|
| WO | 9952060 | 10/1999 |
| WO | WO 0051032 | 8/2000 |

* cited by examiner

*Primary Examiner*—Christopher Revak
*Assistant Examiner*—Longbit Chai
(74) *Attorney, Agent, or Firm*—Price, Heneveld, Cooper, DeWitt & Litton, LLP

(57) ABSTRACT

A method for securing an electronic document (22) comprising attaching a biometric characteristic (20) and the electronic document (22) to form a biometric characteristic-document combination and encrypting the biometric characteristic-document combination to form an encrypted data package (24).

18 Claims, 10 Drawing Sheets

Contents/Layout of Priming Message

| Data | Mandatory | Optional |
|---|---|---|
| Class of biometric | X | |
| Maker of biometric measuring device | X | |
| Specimen biometric measurement | X | |
| Email address of Sender | X | |
| Title of Sender | X | |
| Surname of Sender | X | |
| Home address of Sender | X | |
| Email address of Receiver | X | |
| Photograph | | X |
| Date of Birth | | X |
| Place of Birth | | X |
| County that issued Passport | | X |
| Passport Identification Number | | X |
| Country or State that issued Driving License | | X |
| Driving License Identification Number | | X |
| State that issued NI# or SS# | | X |
| NI# or SS# | | X |
| Professional License Identifier | | X |
| Additional information | | X |

— 42

Note: The priming message consists of the BI (which is mandatory) and the CV (which is optional) all contained within a PGP or PKI encrypted envelope.

Figure 5

| Entry No. | Recipient's e-mail | Biometric sent |
|---|---|---|
| 1 | bob@new.co | Version A |
| 2 | | |

— 50

Sender's database

Figure 7

| Entry No. | e-mail no. | Printing biometric |
|---|---|---|
| 1 | john@old.co | Version A |
| 2 | " | " |
| 3 | " | " |
| 4 | " | " |

— 52

Database in recipient's PC

Figure 8

Contents/Layout of Data Message/EI

| Data | |
|---|---|
| | |
| Version # of data structure | |
| 1ˢᵗ sender specimen biometric | |
| 1ˢᵗ sender email address | |
| 2ⁿᵈ sender specimen biometric | |
| 2ⁿᵈ sender email address | |
| etc | |
| Actual document or information sent | |

56

Note: The EI or data message contains the BI and the actual; message, all of which is contained within a PGP or PKI encrypted envelope.

Figure 10.

Contents/Layout of Data Message/E1

| Data | Contained within a PGP or PKI envelope |
|---|---|
| Version # of data structure | X |
| # of recipients | X |
| Relationship between recipients (AND/OR) | X |
| 1st recipient specimen biometric | X |
| 1st recipient email address | X |
| 2nd recipient specimen biometric | X |
| 2nd recipient email address | X |
| etc. | X |
| # of senders | X |
| 1st sender specimen biometric | X |
| 1st sender email address | X |
| 2nd sender specimen biometric | X |
| 2nd sender email address | X |
| etc. | X |
| Actual document or information sent | X |

Note: The E1 or data message contains the B1 and the actual message, all of which is contained within a PGP or PKI encrypted envelope.

SYSTEM AND METHOD FOR AUTHENTICATING ELECTRONIC DOCUMENTS

The present application relates to a system and method for securing and authenticating electronic documents, in particular e-mail communications.

There are various known methods for securing and subsequently authenticating electronic documents, for example, symmetric encryption. In this case, an algorithm generates a key that is used to encrypt the document. This key is forwarded to the intended recipient. The encrypted message is subsequently sent to the recipient who uses the previously sent key to decrypt the message.

A problem with standard systems is that they use computer to computer based security. Hence, if the sender's computer is compromised, a third party could send a message from it. When this happens, the recipient has no way of knowing that the message was not sent by the authorized sender.

An object of the invention is to provide a more convenient and secure system and method for securing and subsequently authenticating electronic documents, in particular e-mail communications.

Various aspects of the present invention are specified in the independent claims. Some preferred features are defined in the dependent claims.

More specifically, according to the present invention there is provided a method for securing and authenticating an electronic document comprising attaching a biometric characteristic to the electronic document and encrypting the biometric characteristic-document combination.

Preferably, the method involves sending the encrypted combination to a pre-determined electronic address.

The method further involves decrypting the encrypted combination in such a way that only partial decryption can be effected in the absence of a match between the attached biometric characteristic and another biometric characteristic, the partial decryption being such as to expose at least a part of the biometric but not the message.

An advantage of this is that it allows secure person to person e-mail communications, based on characteristics that are uniquely identified with the individual securing the document. Hence, even if the security of the processor or computer on which the document is stored is compromised, in the absence of the user's biometric characteristic, it is not possible to open the document.

Preferably, the method includes encrypting the biometric characteristic prior to the encryption of the biometric characteristic-document combination.

According to the present invention there is provided a system for securing and authenticating an electronic document comprising means for attaching a biometric characteristic to the electronic document and means for encrypting the biometric characteristic-document combination.

Preferably, means for decrypting are provided for ensuring that only partial decryption can be effected in the absence of a match between the attached biometric characteristic and another biometric characteristic, the partial decryption being such as to expose at least a part of the biometric but not the message.

Preferably, the system includes means for encrypting the biometric characteristic prior to the encryption of the biometric characteristic-document combination.

According to the present invention there is provided a computer program, preferably on a data carrier or record, for securing and authenticating an electronic document comprising means for attaching a biometric characteristic to the electronic document and means for encrypting the biometric-document combination.

Preferably, means for decrypting are provided for ensuring that only partial decryption can be effected in the absence of a match between the attached biometric characteristic and another biometric characteristic, the partial decryption being such as to expose at least a part of the biometric characteristic but not the message.

By biometric characteristic, it is meant an electronic version of at least any one of the followings: a signature, the pressure distribution when the user signs his signature, finger length, a fingerprint, DNA, iris characteristics, retina characteristics, facial tomography, facial shape, ear prints, typing speed, typing pressure and voice recognition. Of course, other options may be possible.

According to another aspect of the present invention there is provided a system for securing and authenticating an electronic document comprising means for attaching a first biometric characteristic to the electronic document and means for preventing opening of the document in the absence of a match between the attached first biometric characteristic and a second biometric characteristic.

Preferably, the means for preventing opening of the document comprise encryption means for encrypting within a single envelope the first biometric characteristic and the attached electronic document. Means are preferably provided for partially decrypting the envelope so as to expose at least a part of the first biometric characteristic. Means for comparing the first and second biometric characteristics are provided, wherein in the absence of a match between the first and second biometric characteristics, the decryption means stop the decryption process so that the document is not exposed.

Preferably, the system further includes a biometric sensor for reading a biometric characteristic. This characteristic can be used as the first biometric characteristic or stored for later use. Preferably, the sensor is operable to verify that a user is authorized to use the system.

Preferably, means are provided for sending a first biometric characteristic to a remote location together with details of the originating person, for example the e-mail address of the sender. Preferably, the biometric characteristic is stored.

Preferably, the stored biometric is used as the second biometric for comparing with the first biometric that is attached to the document.

Preferably, means are provided for storing a list of authorized users of the system, which list includes a biometric characteristic for each user. Preferably, the second biometric characteristic is stored in the list of authorized users. The list of authorized users may be stored in a local database on, for example, the user's PC for internet use or alternatively in a secure central database for intranet use.

According to another aspect of the present invention there is provided a method of securing and authenticating an electronic document comprising attaching a first biometric characteristic to the electronic document and preventing opening of the document in the absence of a match between the attached first biometric characteristic and a second biometric characteristic.

Preferably, the step of preventing opening of the document comprises encrypting within a single envelope the first biometric characteristic and the attached electronic document, partially decrypting the envelope so as to expose the first biometric characteristic, and comparing the first and second biometric characteristics, wherein in the absence of a match between the first and second biometric characteristics, the decryption means stop the decryption process so that the document is not exposed.

According to yet another aspect of the present invention there is provided a computer program, preferably on a data carrier, for securing and authenticating an electronic document comprising means for attaching a first biometric characteristic to the electronic document and means for preventing opening of the document in the absence of a match between the attached first biometric characteristic and a second biometric characteristic.

Preferably, the means for preventing opening of the document comprise encryption means for encrypting within a single envelope the first biometric characteristic and the attached electronic document, decryption means for partially decrypting the envelope so as to expose the first biometric characteristic, and means for comparing the first and second biometric characteristics, wherein in the absence of a match between the first and second biometric characteristics, the decryption means stop the decryption process so that the document is not exposed.

According to a yet further aspect of the invention, there is provided an electronic device, such as a pc or any handheld device such as a mobile telephone or a Palm Pilot (trade mark) or a remote control for a television, that includes a biometric sensor and means for attaching a biometric characteristic and an electronic document or message. Preferably, means are provided for encrypting the combined biometric characteristic and electronic document to provide an encrypted signal. Preferably, means are provided for partially decrypting an encrypted signal in order to expose at least a part of the biometric characteristic, but not the document. Preferably, means are provided for preventing completion of the decryption in the absence of a match between the biometric characteristic that is attached to the document and another such characteristic.

Various systems in which the invention is embodied will now be described by way of example and with reference to the following drawings:

FIG. 5 shows an example of the contents of a priming message;

FIG. 7 is an example of a database stored in a sender's pc;

FIG. 8 is an example of a database stored in a recipient's pc;

FIG. 10 is another example of the message of FIG. 9;

FIG. 11 is another version of the message of FIG. 9, and

The system and method in which the invention is embodied allow secure person to person e-mail communications. By e-mail it is meant electronic communications that can be sent over the internet or any other suitable telecommunications network such as an intranet or any other data transfer system, for example, the moving of a floppy disc.

Figure 1:
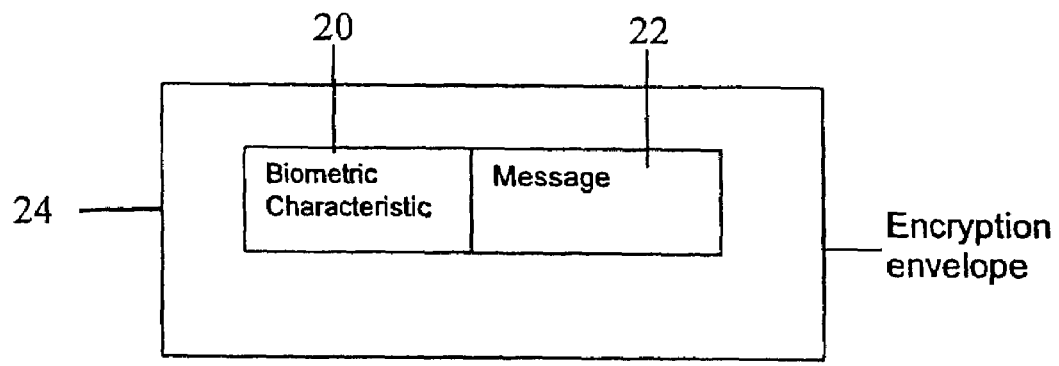
FIG. 1 shows an electronic document attached to a biometric characteristic and encrypted in a single encryption envelope.

The system secures e-mail communications by reading and attaching an individual's biometric characteristic 20 to a message 22 that is to be sent and encrypting the entire package within an encrypted envelope 24, as shown in FIG. 1. By biometric characteristic 20, it is meant an electronic version of at least any one of the following a signature, the pressure distribution when the user signs his signature, finger length, a fingerprint, DNA, iris characteristics, retina characteristics, facial tomography, facial shape, ear prints, typing speed, typing pressure and voice recognition. Of course other options may be possible.

The use of the biometric characteristic 20 in this way provides a method for uniquely identifying the sender of the e-mail. Once encrypted, the message is sent to the intended recipient's pc, where it is partially decrypted in order to expose the biometric characteristic 20. The exposed biometric 20 is then compared with a biometric characteristic stored on the recipient's pc. If the exposed and stored characteristics match, then the decryption process is completed so that the message is exposed. If not, the decryption process is stopped and the message remains secure. In this way, the biometric characteristic 20 is a means for enabling decryption of the package and serves to both identify the source of the attached document and provide access to it.

Figure 2:
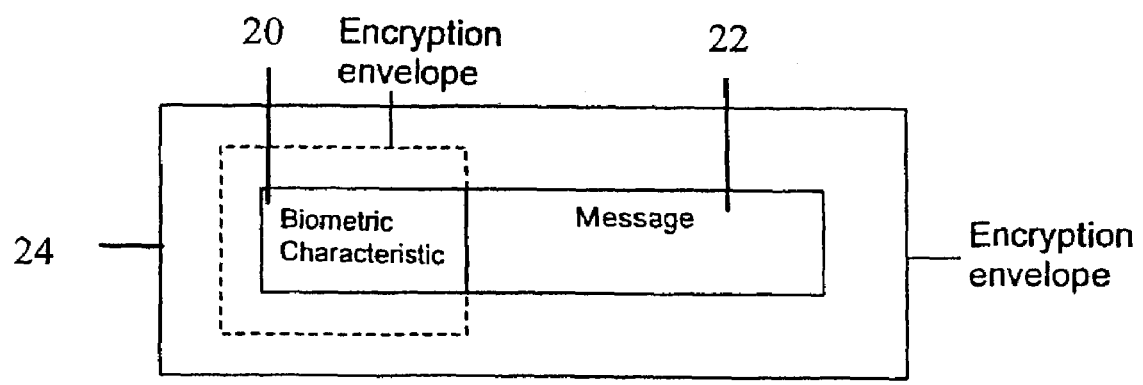
FIG. 2 shows an electronic document attached to an encrypted biometric characteristic, the entire package being encrypted in a single encryption envelope.

For additional security, prior to attaching the biometric characteristic to the message, it may be encrypted as shown in FIG. 2. In this way, when the encrypted package is received by the recipient, not only the complete package has to be decrypted but additionally, the biometric characteristic 20 must be decrypted in order to carry out the step of comparing the attached and the stored characteristics.

The system can be used to secure e-mail communications sent over the internet or equally over an intranet. For the sake of clarity, each will be described separately. However, it will be understood that the basic principles of each system are the same.

Internet E-mail Communications

Figure 3:
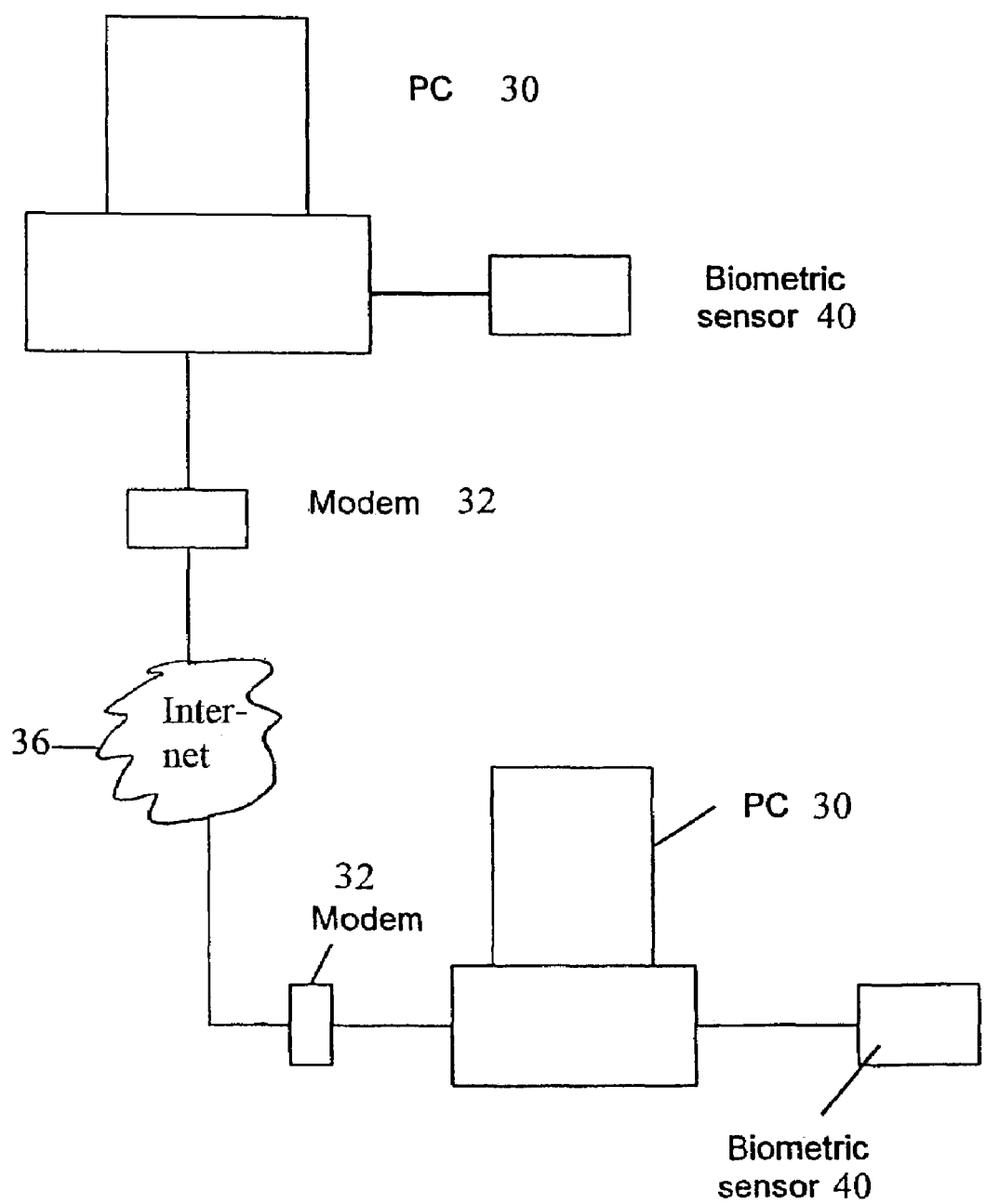
FIG. 3 shows an internet based system for authenticating electronic documents.
Figure 4:
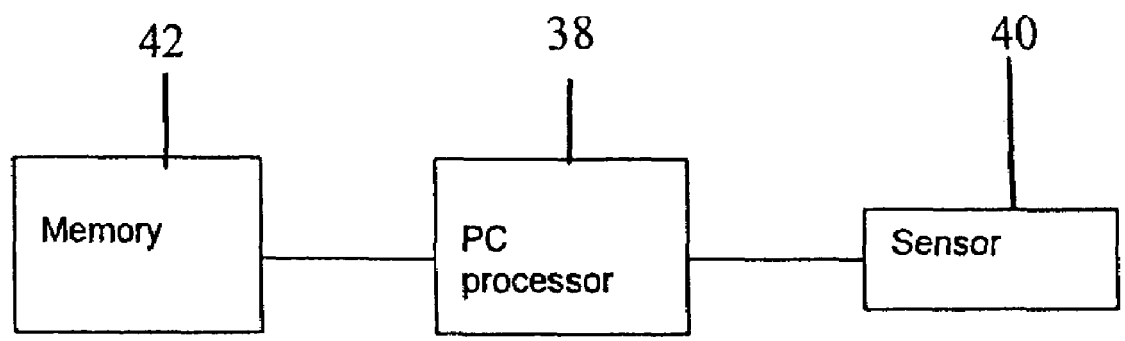
FIG. 4 shows a block diagram of internal components of each of the pcs of FIG. 3.

FIG. 3 shows two PCs 30 that are each connected via a modem 32 to the Internet 36. Each PC has a processor 38 that is connected to a biometric reader 40 and a memory 42, as shown in FIG. 4. Readings taken by the sensor 40 can be passed via the processor 38 and stored in the memory 42. Contained in each PC 30 is a computer program for controlling a method of securing and authenticating e-mail communications. Also included is information on authorized users of the system.

The security and authentication of the communication can be done at various levels—the simplest will be described first.

Type 1—Authenticated Sender to any Recipient at One Address

When an authenticated e-mail is sent, the sender presents his/her biometric to the sensor 40, which takes a reading of the biometric characteristic 20, in this case a fingerprint. If this is the first e-mail communication sent to the recipient, a priming message is generated. This has a data structure 42 that includes the read biometric characteristic, as shown in F*igure* 5. Also included in the data structure of the priming message are the e-mail addresses of both the sender and the recipient, the nature of the biometric characteristic, i.e., in this case a fingerprint, the maker of the biometric device, the e-mail of the sender, the title of the sender, the name of the sender, the surname of the sender and his home address. Optionally included are the version number of the authentication program that is being used and a date and time stamp.

The data structure 42 contains the control information and identifies not only who sent the document but also who is to receive that document.

Optionally included in the priming message is a CV that contains bona fide details such as a photograph of the sender, the sender's date and place of birth, the country that issued the sender's passport, his passport number, the state or country that issued the sender's driver's license, his driver's license number, the state that issued the sender's National Insurance (NI) or social security (SS) number, his NI or SS number, a professional license identifier, and any other information that can be uniquely identified with the user such as a bank number. All of this information could be sent in the initial primer message if desired. Alternatively, a limited amount of information could be included in the first primer message, with more detailed information being sent when a relationship has been established between the sender and the recipient.

The information contained in the CV may be used for enforcing any contracts exchanged via the secure e-mail mechanism.

Figure 6:
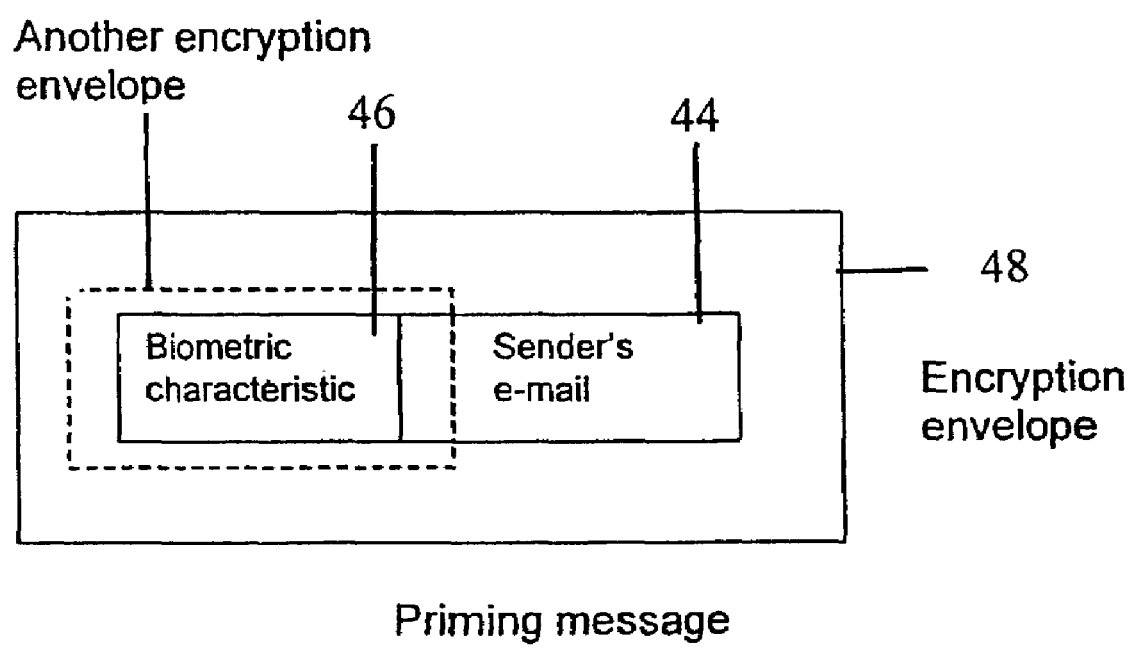
FIG. 6 is an example of a priming message.

Once the relevant information 44, e.g. the sender's e-mail address, is attached to the read biometric characteristic 46, the entire package is encrypted within, for example, a PGP (Pretty Good Privacy) or PKI (Public Key Incryption) electronic envelope 48, as shown in FIG. 6. For additional security, the data structure may also be encrypted within the encryption envelope, the encryption of the data structure being different to that of the overall envelope. The read biometric characteristic is stored together with the recipient's e-mail address in a database 50, as shown in FIG. 7 in, for example, the memory of the sender's pc. The encrypted message is then forwarded as a priming message to the intended recipient's e-mail address.

When the priming message is received at the recipient's terminal, it is decrypted to expose the e-mail address of the intended recipient. This is compared with the e-mail address of the actual recipient. In the absence of a match between the attached and actual e-mail addresses, the decryption is stopped. This check helps to prevent spoofing, i.e. the interception and re-directing of e-mails and subsequent sending to the wrong address. If, however, the e-mail addresses do match, the decryption process is continued to expose the sender's message, the attached biometric characteristic and the sender's e-mail address. The biometric characteristic is then stored as a "specimen" characteristic together with the sender's e-mail address in a local primer database 52, as shown in FIG. 8, in, for example, the recipient's pc.

Figure 9:
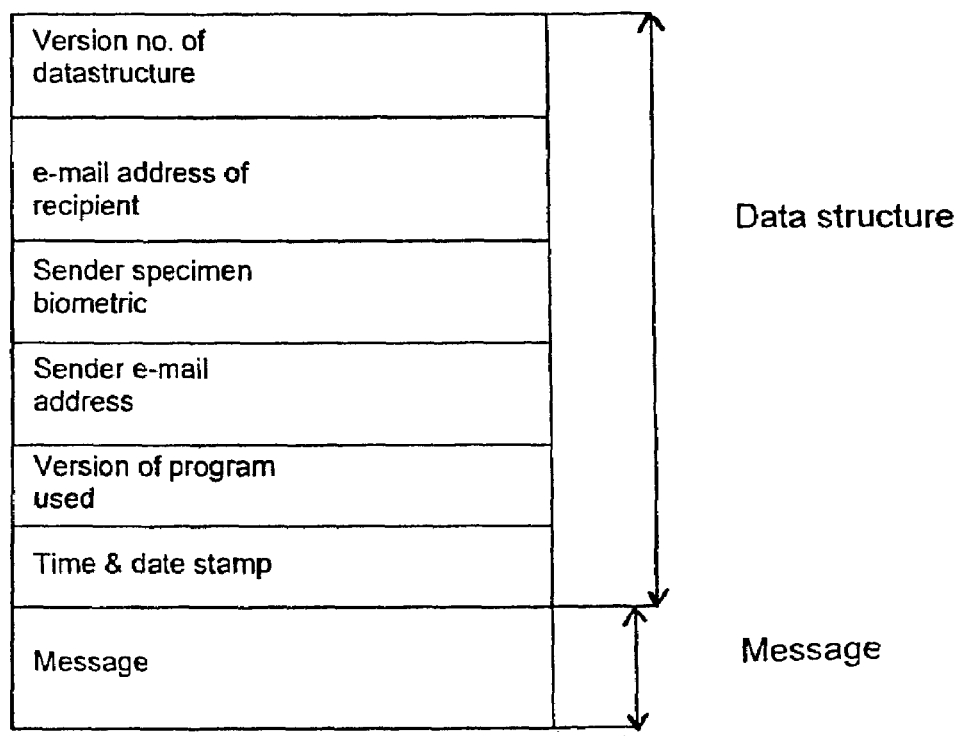
FIG. 9 is an example of a message that has been secured by a single sender for sending to a single recipient at a remote e-mail address.

Once the recipient is primed, the message that is to be sent from the sender's pc is attached to a message data structure. This data structure 54 contains the version number of the data structure, the specimen biometric that was sent to the recipient in the priming message, together with various other bits of information, such as the e-mail address of the sender, the version of the authentication program that is being used, the e-mail address of the recipient and a date and time stamp. This is shown in FIG. 9.

When the data structure and the message are attached, the entire data block is encrypted using any form of standard encryption, for example, the data block could be encrypted in a PGP or PKI envelope. The encrypted message is then forwarded to the intended recipient.

In order to open the message, the encryption envelope 24 firstly has to be decrypted. The control program is, however, set-up only to partially decrypt the message so as to expose firstly the recipient's e-mail address. This is then compared with the actual address to which the e-mail was sent. If these e-mail addresses do not match, the decryption process is stopped. In contrast, if the e-mail addresses do match, the decryption process is continued to expose the sender's e-mail address.

Using the sender's e-mail address as a search tool, the corresponding specimen biometric stored in the recipient's database 52 can be found with relative ease. Once this is done, the partial decryption is continued to expose at least a part of the biometric characteristic 20. This part is compared with the corresponding part of the stored specimen biometric. The process of decrypting and comparing is continued until the whole of the attached and the specimen biometric characteristics are compared. If the biometric characteristics match, the decryption of the entire data parcel continues so that the message is exposed. In this case, the recipient is able to read the message and additionally is assured of its authenticity. If, however, the biometric 20 of the sender does not correspond to the specimen biometric characteristic stored in the recipient's database, the encryption process is stopped and the message 22 remains secure.

It should be noted that if the step of comparing the biometric characteristics is negative, the partially decrypted message 22 is deleted from memory. In this way the biometric characteristic 20 of the sender is never exposed to an unauthorized party. This prevents the system from being compromised.

After the first exchange of the biometric characteristic 20, it is not always necessary to send the primer message, although this can be done if desired. For example, it may be that the sender wishes to up-date his CV. In this case, the next time the sender wishes to send a message to a particular recipient, a new primer message is automatically generated and sent. The recipient is notified that the primer message is to be changed using, for example, a dialogue box and is asked if he wishes to accept this up-date. If the recipient indicates that the change is to be accepted, his local database is modified to show the initial primer message details and any subsequent changes.

If further primer messages are not sent, when the user wants to secure an e-mail message, the biometric sensor 40 has to be pressed and a fingerprint characteristic read. This characteristic is verified to check that the user is an authorised user. The e-mail address of the intended recipient is then read and the sender database is searched to identify the specimen biometric characteristic that was last forwarded to the recipient. This stored characteristic is then included in a data structure as before and attached to the message. The entire data package is encrypted and sent to the relevant e-mail address.

As before, the encrypted data package is partially decrypted to expose the recipient's e-mail address and the relevant checks are made. Subject to these checks being positive, the decryption process continues to expose the sender's e-mail address and the biometric characteristic 20. The recipient's primer database 52 is then searched to find the appropriate sender's e-mail address and so the correct specimen biometric characteristic. If the biometric characteristics match, the encryption of the data parcel continues so that the message is exposed. If, however, the biometric characteristic attached to the message does not correspond to the biometric stored in the recipient's database, the encryption process is stopped and the message remains secure.

It should be noted that if a new primer message is not sent every time the sender wants to send an e-mail, the biometric characteristic read when the user presses the sensor is not the characteristic that is compared directly with the characteristic attached to the secured document. Instead, the read characteristic is merely used to identify the user and so track down an exact copy of the specimen biometric that was originally sent in the primer message. This is because biometric readings can vary according to the physical condition of the user. For example, if fingerprints are used, the exact biometric characteristic will vary depending on whether the user is hot or cold or his hands are greasy, etc. These variations can be significant enough to affect the identification of the user, in which case the software asks the user to clean his finger and press the sensor again to try to obtain another reading. This is done until a suitable specimen biometric reading is obtained. This is well known and biometric sensors are adapted to take this into account. However, even minor variations in the read biometric may make it difficult to compare it with the biometric attached to the document. For this reason, the step of comparing is done using the exact copy of the specimen biometric that is stored in the sender's and recipient's secured biometric databases.

In the method described above only one sender biometric characteristic is attached to the message that is to be authenticated. However, there may be circumstances in which a plurality of users has to authenticate the contents of a document.

Type 2—Authenticated Sender and Authorised Recipient

The above-described method ensures that any person receiving an e-mail can authenticate its origin. In order to provide the sender with some security that the message is received by the correct person, provisions are made for ensuring that only an authorised recipient is able to open a particular message. In this case, when the recipient receives the initial primer message, a prompt is generated asking him if he wants to have a secure communication with the sender. If the recipient does wish to do this, he needs to send a priming message back to the original sender. To do this, he presses the sensor 40 and a specimen biometric characteristic is read. This specimen characteristic is then attached to a data structure similar to that described previously in relation to priming messages and optionally a CV and the entire message is encrypted and returned to the sender. The returned specimen characteristic is then stored in both the sender's and the recipient's database, together with the initial specimen biometric characteristic for the sender.

In this case when the message is to be sent, the datastructure includes not only the sender's specimen biometric characteristic, but also the recipient's. When the message is received at the recipient's PC it is partially decrypted to expose the recipient's biometric characteristic. The recipient is then prompted to press the biometric sensor so that a reading can be taken. A check is then completed to ensure that the recipient is an authorized user. Subject to this check being positive, the decryption process is continued to expose the sender's e-mail address and the attached sender's specimen biometric, but not at this stage the message. The recipient's database is then searched to identify the stored biometric associated with the sender's e-mail address. The attached and stored biometrics are then compared. If the comparison indicates that the biometrics are the same, then the message is decrypted. In this way, the recipient knows exactly who sent the message and the sender is assured that only the intended recipient can open it.

Type 3—Authenticated Senders from One Address to a Recipient at One Address

In order to send a message that has been authenticated by more than one sender, a biometric characteristic for each different sender is attached. An example of the contents of such a multiple authenticated message 56 is shown in FIG. 10. In this case, in order to authenticate the document, each user has to press the sensor 40 in order to have their biometric characteristic read. Once they are identified as being authorized users, a specimen characteristic for each is attached to the document, together with each of the sender's e-mail addresses. Each of the specimen characteristics is stored together with the corresponding e-mail addresses and the entire data package is then encrypted as before. In addition, if a primer has not already been sent, one is prepared and forwarded to the recipient. The encrypted message is then to the recipient.

In order to read the document, the recipient's PC has to first partially decrypt the envelope sufficiently to expose the senders' biometric characteristics and e-mail addresses, without exposing the message. The attached biometric characteristics are then compared with those stored in the database on the recipient's machine. Subject to this check being positive for each of the senders' biometric characteristics, the decryption process is completed and the message exposed.

Having more than one party involved improves the overall authenticity of the message.

Of course, the sender may want to send messages to multiple recipients. In this case, the message could be sent to a plurality of different e-mail addresses or a single address to which each recipient has access.

Type 4—Authenticated Sender and Multiple Authorised Recipients

In this case a specimen biometric characteristic for each recipient would have to be provided to the user and subsequently included in the data structure 58, as shown in FIG. 11. When multiple recipients are to receive the message an and/or function can be defined specifying whether the message can be opened by every party individually (the "or" function) or whether the message can only be opened when the entire group is present. In the case of an "or" function, the message is sent to each recipient individually. In the case of an "and" function, the message is sent to a single specified e-mail address and each named recipient would have to successively press the sensor in order to open the message.

Intranet E-mail Communications

Figure 12:
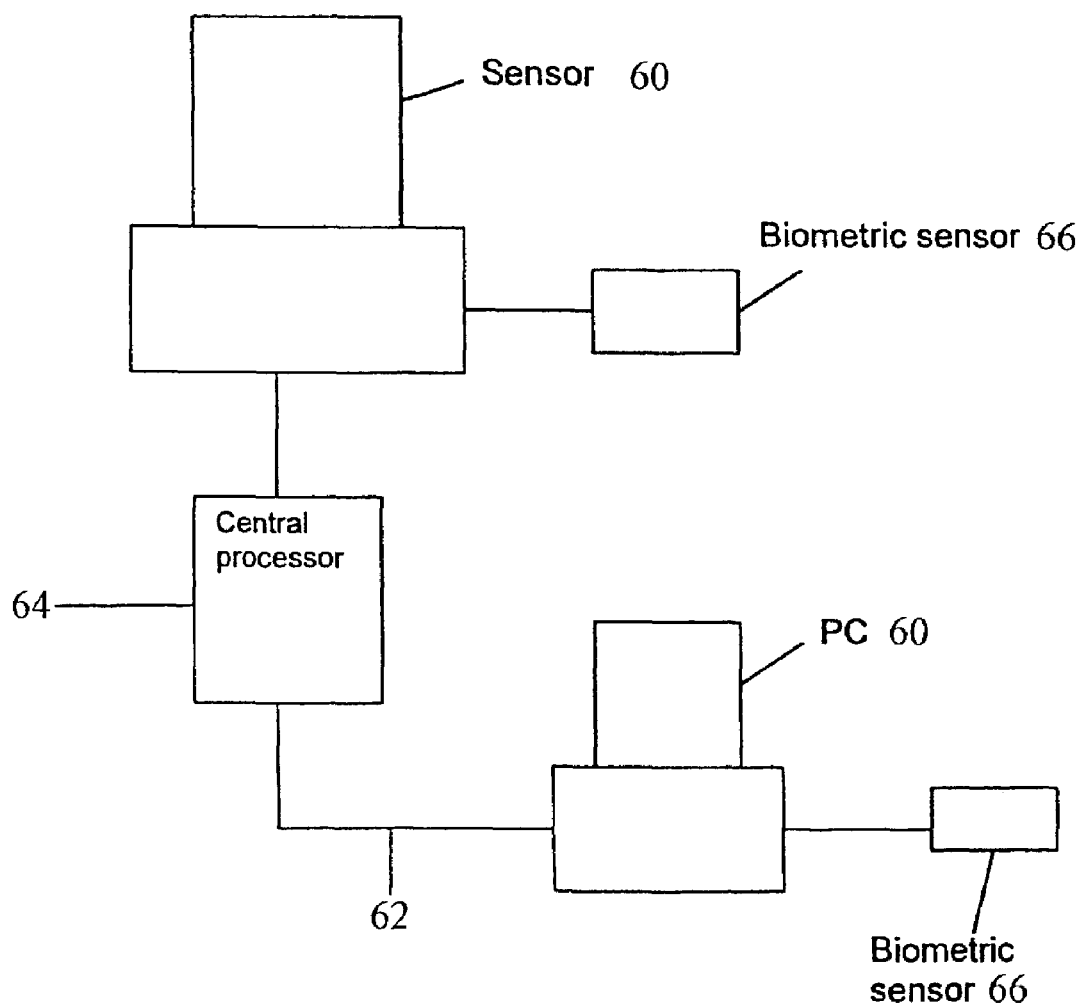
FIG. 12 shows an intranet based system for authenticating electronic documents.

FIG. 12 shows a plurality of PCs 60 that are each connected via an Intranet 62 that is controlled by a central processor 64. As before, each PC 60 has a processor that is connected to a biometric reader 66 and a memory (not shown). Readings taken by the reader can be passed via the processor and stored in the memory. Contained in each PC 60 is a computer program for controlling a method of securing and authenticating e-mail communications. Contained in the central processor 64 is a list of the names of authorized users and their biometric characteristics. This list is held in a secure area and is only accessible by authorized managers.

Operation of the system of FIG. 12 is similar to that of the internet arrangement of FIG. 3, except that all of the pc users' biometric characteristics are stored at a central location rather than being contained in local databases distributed about the network. Hence, there is no need to send the initial priming message.

In the case of the intranet of FIG. 12, in order to gain access to the system the user must press the sensor 66, which reads the user's fingerprint and checks that he is an authorized user. Provided this check is positive, the user is then allowed access to the system. If the user subsequently wants to send an e-mail, the biometric characteristic that is stored in the list of authorized users is included in a data structure, as before, and attached to the message. The entire data package is then encrypted and sent to the intended recipient.

On receipt of the message, it is partially decrypted to expose the e-mail address of the sender and the attached biometric characteristic. The control software in the recipient's PC 60 causes the list of authorized users to be searched on the sender's e-mail address, in order to determine the corresponding biometric characteristic. If this is identical to the biometric attached to the message, the decryption process is continued to expose the message. If not, the description process is stopped and the message remains secured.

As with the internet system, in the intranet system, multiple biometric characteristics can be attached to any message that is to be sent. In addition, the recipient, or indeed multiple recipients, may need to enter a biometric characteristic in order to open the message.

Securing of Electronic Document More Generally

Although each of the systems above are described with reference to the sending of e-mail, it will be understood that the general principles of the invention can be applied to secure and/or authenticate a static document. To do this, a "securing" option is available to the user. If this option is selected, the user is asked to press the biometric sensor. His fingerprint is then read. The document that is to be secured and the read biometric characteristic are attached and encrypted using, for example, symmetric encryption. The encrypted document is stored in, for example, the memory of the pc. A user identifier, such as his e-mail address and the read biometric characteristic are also stored in the memory in a secure document database.

When the secured document is subsequently to be opened, the user selects it from a menu and a prompt is automatically generated asking the user to press the biometric sensor. The biometric characteristic is read and checked against the list of authorised users to verify the user's identity. Subject to this check being positive, the encrypted document is partially decrypted, this partial decryption being sufficient to expose the biometric characteristic, but not the document itself. The database of secured documents is accessed and data entry for the desired file is identified. Once found, the associated biometric characteristic is compared with the biometric characteristic attached to the document. Provided this check is positive, the document is then opened. In the event that this check is not positive, the decryption process is stopped and the document is not exposed.

In all of the arrangements described above, security and authenticity are provided by attaching a biometric characteristic to an electronic document and subsequently encrypting the characteristic/document combination. In order to provide additional security, the biometric characteristic could itself be encrypted.

The systems described above specifically use pcs for sending and receiving messages. However, the software for controlling the securing and authenticating process and the biometric sensor could be provided in any processor or system that can be used to store electronic documents or send electronic communications, for example, a Palm Pilot (trade mark) or a mobile telephone. In this case, the biometric sensor could be incorporated directly into the Palm Pilot or telephone.

Whilst the biometric reader is shown in the accompanying drawings as being in a unit that is separate to the pc, it will be understood that it could equally be included in the main body of the pc itself. Alternatively, the sensor could be incorporated into, for example, the keyboard or the mouse of the pc.

An advantage of the present invention is that it provides a system in which individuals are the authorized users, not machines. Hence, if, for example, a user logged into his PC, but left it unattended, a third party could not send an authenticated e-mail. A further advantage is that the use of a biometric characteristic means that the user does not need to carry around additional equipment or even remember a code number. This means that the system is much simpler for the user to operate. In addition, the system is easy to adapt to the user's needs.

A skilled person will appreciate that variations of the disclosed arrangements are possible without departing from the invention. Accordingly, the above description of several embodiments is made by way of example and not for the purposes of limitation. It will be clear to the skilled person that minor modifications can be made without significant changes to the operation described above.

The invention claimed is:

1. A method for securing an electronic document for electronic mail communication between enterprises, the method comprising:
    attaching at least one e-mail address and biometric characteristic of a sender of the electronic mail communication at a first enterprise to electronic identification information of the sender to form an e-mail address-biometric characteristic-electronic identification information combination;
    attaching the e-mail address-biometric characteristic-electronic identification information combination to at least one e-mail address of a recipient at a second enterprise to form an inner data envelope;
    encrypting the inner data envelope to form an inner encrypted data envelope;
    attaching the inner encrypted data envelope to the electronic document to be sent to form an inner encrypted data envelope—electronic document combination;
    encrypting the inner encrypted data envelope-electronic document combination to form an outer encrypted envelope; and
    sending the outer encrypted envelope as the electronic mail communication to a group of multiple recipients;
    wherein upon receipt of the electronic mail communication by the group of multiple recipients, the communication is partially decrypted to expose the sender's biometric characteristic; and
    wherein decryption of the electronic document is determined by the sender specifying whether the electronic document can be opened by each recipient individually or whether the electronic document can only be opened when the entire group of multiple recipients is present.

2. A method as claimed in claim 1, further comprising:
    partially decrypting the outer encrypted envelope, thereby to expose the biometric characteristic but not the electronic document, to form an exposed biometric characteristic;
    comparing the exposed biometric characteristic with a stored biometric characteristic;
    decrypting the electronic document when there is a match between the stored and the exposed biometric characteristics; and
    stopping decrypting where there is no match between the stored and the exposed biometric characteristics.

3. A method as claimed in claim 1, further comprising partially decrypting the biometric characteristic to expose at least a part of the biometric characteristic but not the electronic document, and comparing at least the part of the biometric characteristic with a corresponding part of a stored biometric characteristic, wherein, in an absence of a match between the part of the biometric characteristic and the corresponding part of the stored biometric characteristic, the decryption process is stopped.

4. A method as claimed in claim 2, further comprising deleting the e-mail address-biometric characteristic-electronic identification information combination when there is no match between the stored and the exposed biometric characteristics.

5. A method as claimed in claim 1, further comprising reading the biometric characteristic from a sensor.

6. A method as claimed in claim 1, wherein the biometric characteristic is an electronic version of at least any one of the following: a signature, the pressure distribution when a user signs a signature, finger length, a fingerprint, DNA, iris characteristics, retina characteristics, facial tomography, facial shape, ear prints, typing speed, typing pressure and voice recognition.

7. A method as claimed in claim 1, including attaching a biometric characteristic of the recipient to the e-mail address-biometric characteristic-electronic identification information combination where the electronic mail communication is to be sent in response to a previous electronic mail communication from the recipient, and wherein upon receipt of the electronic mail communication by the recipient, the communication is partially decrypted to also expose the recipient's biometric characteristic.

8. A method as claimed in claim 7, wherein each biometric characteristic is stored in a central memory, together with an identifier for identifying a person associated with each characteristic.

9. A method as claimed in claim 8, further comprising sending a priming message to the at least one e-mail address, which priming message includes a copy of the biometric characteristic, and storing the biometric characteristic in the memory, together with an identifier for identifying a person associated with the characteristic.

10. A method as claimed in claim 1, wherein the electronic identification information is at least one of a photograph of the sender, a date of birth of the sender, a place of birth of the sender, passport identification of the sender, driving license number of the sender, social security number of the sender, professional license number of the sender, country of issuance of the social security number of the sender, country of issuance of passport of the sender, and country or state of issuance of driving license of the sender.

11. A computer program for securing an electronic document for electronic mail communication between enterprises, the computer program being stored in a computer readable medium, wherein:
the computer readable medium has instructions when executed to perform:
attaching at least one e-mail address and biometric characteristic of a sender of the electronic mail communication at a first enterprise to electronic identification information of the sender to form an e-mail address-biometric characteristic-electronic identification information combination;
attaching the e-mail address-biometric characteristic-electronic identification information combination to at least one e-mail address of a recipient at a second enterprise to form an inner data envelope;
encrypting the inner data envelope to form an inner encrypted data envelope;
attaching the inner encrypted data envelope to the electronic document to be sent to form an inner encrypted data envelope—electronic document combination;
encrypting the inner encrypted data envelope-electronic document combination to form an outer encrypted envelope; and
allowing the outer encrypted envelope to be sent as the electronic mail communication to a group of multiple recipients by the sender;
wherein upon receipt of the electronic mail communication by the group of multiple recipients, the communication can be partially decrypted to expose the sender's biometric characteristic; and
wherein decryption of the electronic document is determined by allowing the sender to specify whether the electronic document can be opened by each recipient individually or whether the electronic document can only be opened when the entire group of multiple recipients is present.

12. A computer program as claimed in claim 11, wherein:
the computer readable medium further has instructions for:
partially decrypting the outer encrypted envelope, thereby to expose the biometric characteristic but not the electronic document, to form an exposed biometric characteristic;
comparing the exposed biometric characteristic with a stored biometric characteristic;
decrypting the electronic document when there is a match between the stored and the exposed biometric characteristics; and
stopping decrypting when there is no match between the stored and the exposed biometric characteristics.

13. A computer program as claimed in claim 11, wherein:
the computer readable medium further has instructions for:
partially decrypting the outer encrypted envelope to expose at least a part of the biometric characteristic but not the electronic document;
comparing the at least a part of the biometric characteristic with a corresponding part of a stored biometric characteristic;
decrypting the electronic document when there is a match between the stored and the exposed biometric characteristic; and
stopping the decryption process when there is no match between the stored and the exposed biometric characteristic.

14. A computer program as claimed in claim 12, further comprising instructions for deleting the e-mail address-biometric characteristic-electronic identification information combination in the absence of a match between the stored and the exposed biometric characteristic.

15. A computer program as claimed in claim 11, wherein the computer readable medium further has instructions for attaching a biometric characteristic of the recipient to the e-mail address-biometric characteristic-electronic identification information combination where the electronic mail communication is being sent in response to a previous electronic mail communication from the recipient, and for allowing that upon receipt of the electronic mail communication by the recipient, the communication is partially decrypted to also expose the recipient's biometric characteristic.

16. A computer program as claimed in claim 15, wherein each biometric characteristic is stored in a central memory, together with an identifier for identifying a person associated with each characteristic.

17. A computer program as claimed in claim 16, further comprising instructions for sending a priming message to the at least one e-mail address, wherein the priming message includes a copy of the biometric characteristic, and storing the copy of the biometric characteristic in the central memory, together with an identifier for identifying the predetermined address.

18. A computer program as claimed in claim 11, wherein the electronic identification information is at least one of a photograph of the sender, a date of birth of the sender, a place of birth of the sender, passport identification of the sender, driving license number of the sender, social security number of the sender, professional license number of the sender, country of issuance of the social security number of the sender, country of issuance of passport of the sender, and country or state of issuance of driving license of the sender.

* * * * *

UNITED STATES PATENT AND TRADEMARK OFFICE
CERTIFICATE OF CORRECTION

PATENT NO.        : 7,346,779 B2  
APPLICATION NO.   : 10/204632  
DATED             : March 18, 2008  
INVENTOR(S)       : Kim Leeper Page 1 of 1

It is certified that error appears in the above-identified patent and that said Letters Patent is hereby corrected as shown below:

Column 1
Line 5, Insert:
-- CROSS-REFERENCE TO RELATED APPLICATIONS

This application is the National Phase of International Application No. PCT/GB01/00803, filed in Great Britain on February 23, 2001 and published on August 30, 2001, designating the United States of America, which claims priority to GB Patent Application 0004287.9, filed on February 23, 2000.

BACKGROUND OF THE INVENTION --.

Column 1
Line 21; before the paragraph beginning "An object of the invention," insert:
-- SUMMARY OF THE INVENTION --.

Column 2
Line 22; "followings" should be -- following --.

Column 3
Line 38; before "Fig. 1," insert -- BRIEF DESCRIPTION OF THE DRAWINGS --.

Column 3
Line 62; before the paragraph beginning "The system and method in which the invention," insert -- DETAILED DESCRIPTION OF THE PREFERRED EMBODIMENT --.

Signed and Sealed this

Sixteenth Day of September, 2008

JON W. DUDAS  
*Director of the United States Patent and Trademark Office*